Jan. 26, 1943. M. E. CHANDLER Re. 22,254

FUEL CONTROL MEANS

Original Filed Feb. 1, 1937 2 Sheets-Sheet 1

Inventor:
Milton E. Chandler
By:- John A. Watson Att'y

Jan. 26, 1943. M. E. CHANDLER Re. 22,254

FUEL CONTROL MEANS

Original Filed Feb. 1, 1937 2 Sheets-Sheet 2

Inventor:
Milton E. Chandler
By: John A. Watson
Atty.

Reissued Jan. 26, 1943 Re. 22,254

UNITED STATES PATENT OFFICE 22,254

FUEL CONTROL MEANS

Milton E. Chandler, Birmingham, Mich., assignor, by mesne assignments, to Chandler-Evans Corporation, Meriden, Conn., a corporation of Delaware Original No. 2,125,886, dated August 9, 1938, Serial No. 123,359, February 1, 1937. Application for reissue April 13, 1939, Serial No. 267,730

12 Claims. (Cl. 261—41)

This invention is an improvement on the carburetor shown in the Milton J. Kittler Patent No. 2,232,392 issued Feb. 18, 1941. In a carburetor of this type it is desirable that the mixture ratio be richer at maximum power than it is under throttle, because the engines to which these carburetors are applied are built so closely to their safety limit that unless excess fuel is used, the engines fail because under the excessive heat the strength of the parts subjected to the heat is reduced.

As pointed out in the above case, the mixture ratio does not vary appreciably with altitude. Hence the applicant has discovered that if he utilizes the rate of flow of fuel to the carburetor he can control the additional fuel by a device controlled by this flow and thereby obtain a definite percentage increase in the mixture ratio. In other words, if the mixture ratio is correct, that is to say, gives a uniform mixture regardless of throttle position or altitude, then a definite deviation from this theoretical mixture for practical purposes can also be controlled by the flow and the percentage increase will be uniform regardless of variations in altitude.

Figure 1:
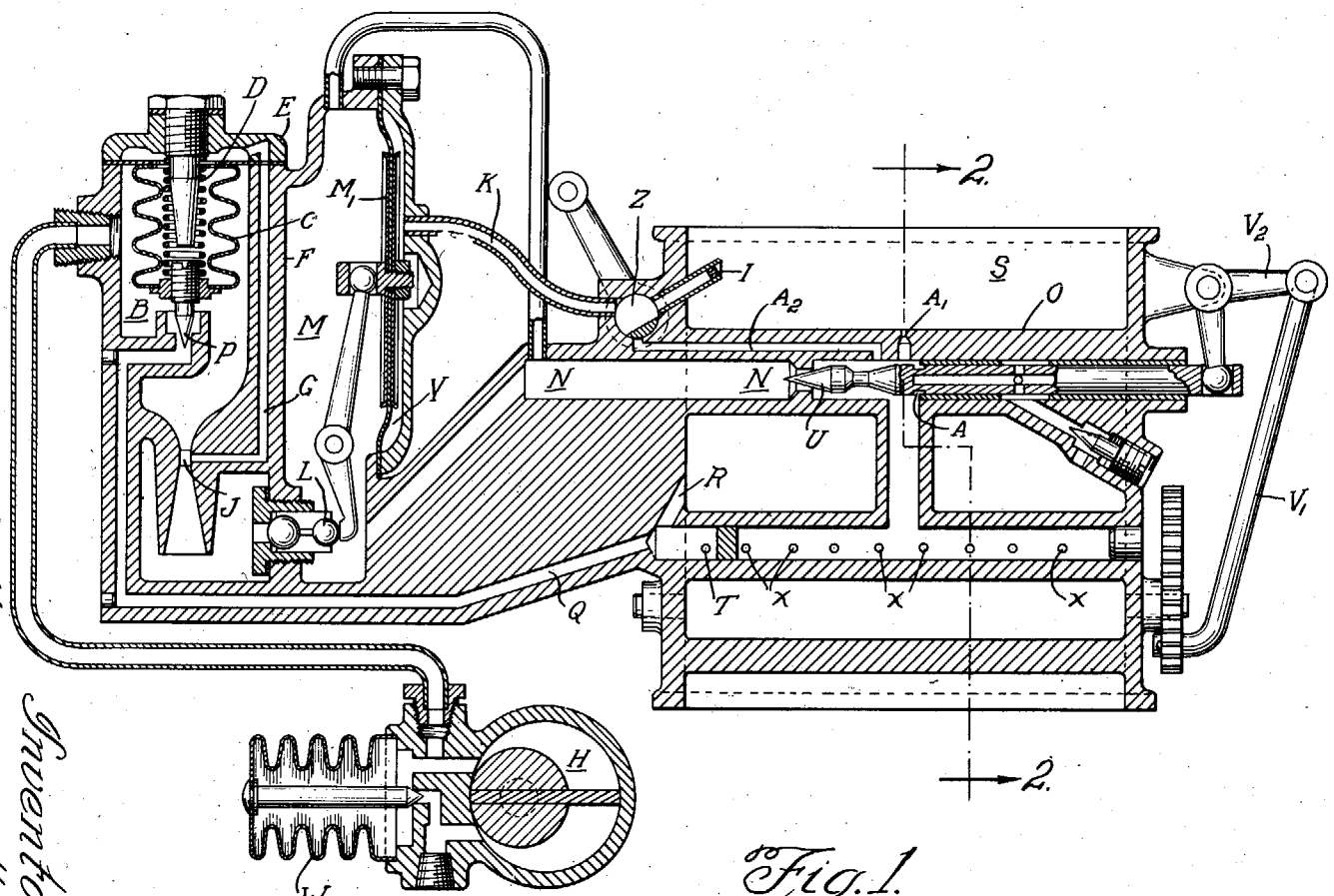
Figure 1 shows a cross sectional elevation taken on plane 1—1 of Figure 2.

In the drawings the fuel supply is connected to an engine driven pump H delivering fuel under a considerable pressure (from 4 to 7 pounds per square inch) controlled by a Sylphon bellows W. B is the fuel entrance chamber in which is located the flexible metal bellows C supported by a helical spring D. This spring is mounted on the cover E which engages with the body F of the control device. A passage G in the body F connects the interior of the bellows C with the throat of a venturi J. This throat is sufficiently restricted so that a definite number of inches of mercury depression is created and transmitted through the pipe G to the interior of the bellows C. The restriction, however, is not sufficient to create an appreciable resistance to the flow of gasoline through J. The gasoline flows through J to the pressure reduction valve L to the diaphragm chamber M through which it discharges under a constant head of relatively low value into the passage N, the flow through which is controlled by the needle valve U which is moved in unison with the throttle valves V, V. The corrugated bellows C carries a needle valve P which serves to cut off the connection between the fuel chamber B and a fuel passage Q and also to regulate the flow therethrough. This passage Q communicates with an air passage R which is connected to the air entrance S. A fuel passage T in the nozzle bar O serves as the fuel outlet from the passage Q into the mixing chamber between the throttles V, V. The mixture of fuel and air controlled by the needle valve U discharges through the opening X into the mixing chamber. When the throttle is closed, a little air is admitted through the annulus A which derives its air from the air entrance S through the center of the hollow needle U. An air vent A1 is provided in the nozzle bar O.

A chamber Y is located at one side of the diaphragm M1 and communicates through the pipe K with the mixture chamber through a passage A2 in the interior of the nozzle bar O.

A valve Z controls the connection between the chamber Y and the openings X so as to modify the pressure in the diaphragm chamber by the nozzle suction. The chamber Y is also connected through the tube I with the air entrance S. The valve Z is so designed that the chamber Y can communicate with the air entrance S through the pipe I or with the mixing chamber through the openings X, X or with both the air entrance S and with the nozzle suction at X. The opening of the needle valve U is controlled by the movement of the throttles V, V through the linkage V1, V2.

*Operation*

The operation of the engine proceeds in a normal way until the flow through the venturi J reaches a predetermined value at which time the depression therein is sufficient to overcome the spring D and the needle valve P is opened. When the needle valve P opens, fuel flows from the fuel regulating chamber W to the passage Q under the pressure of fuel in the fuel pump H. Additional fuel is therefore discharged through T into the mixing chamber. As the pressure in chamber W runs from four to seven pounds per square inch, the flow through T is determined by the pressure in chamber W and the opening around the needle valve P rather than by the flow of air from the air entrance S through the passage R into the fuel outlet T. In other words, the additional fuel admitted at T is directly controlled solely by the quantity of fuel flowing through the venturi J and the absolute pressure of the fuel from the fuel pump, but, indirectly, as is obvious, by the air flow through the air entrance passage S. The result is that when the engine is opened up and the horsepower developed reaches a critical value, a definite amount of excess fuel is admitted through the opening T and the tendency of the engine to burn up is counteracted by the cooling effect of the additional fuel admitted through the opening T, which addition is proportional to the normal flow. By making the mixture excessively rich, it is possible to develop an extra 20% in power. The extra fuel produces a lower engine temperature and thus prevents the engine overheating.

Figures 2, 3, 4:
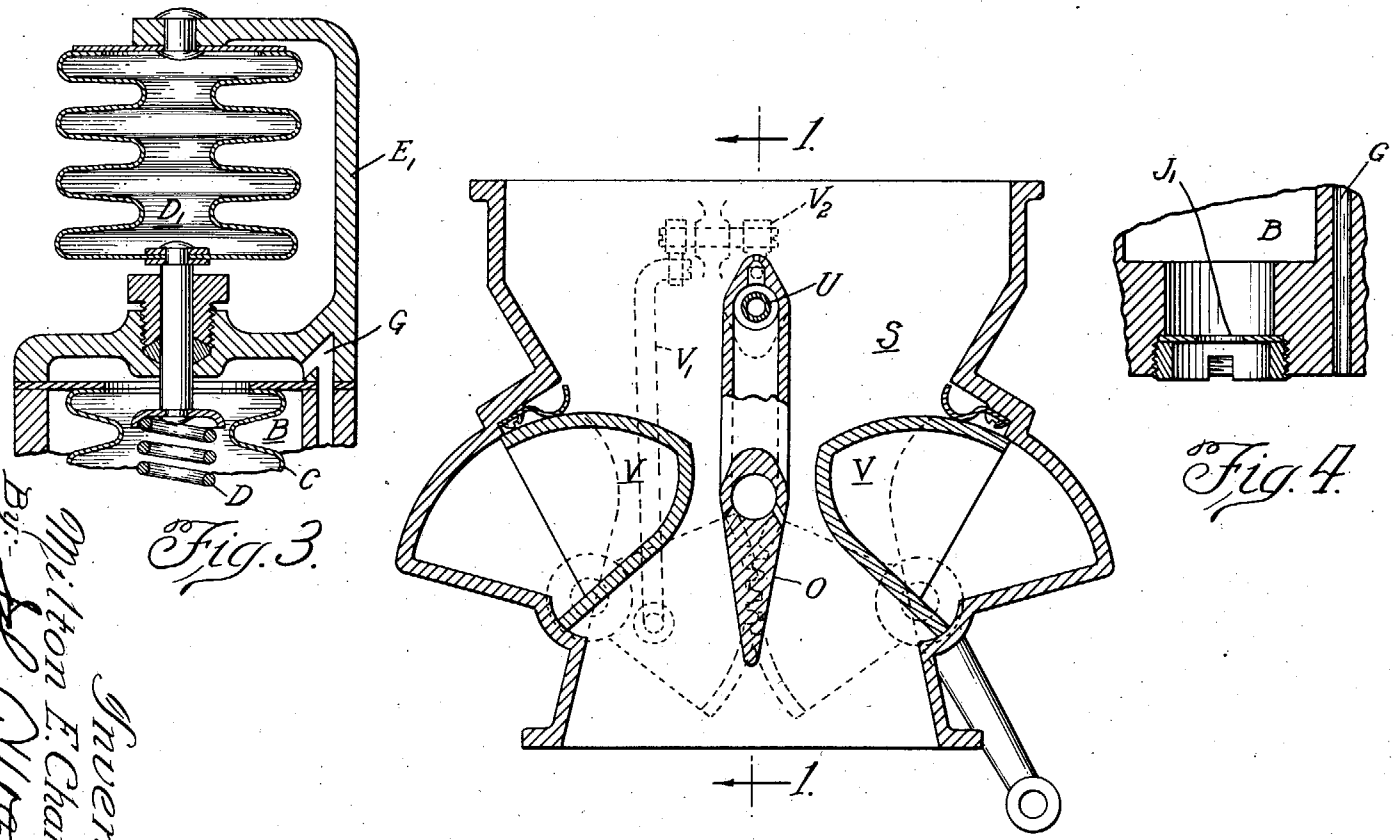
Figure 2 shows a cross sectional elevation taken on plane 2—2 of Figure 1.
Figure 3 shows a modification of the novel control means.
Figure 4 shows another modification of the control means.

In Figure 3 the spring D is supported by a Sylphon bellows D1 so that as the altitude increases the spring D becomes compressed and hence the opening of the needle valve P is reduced.

In Figure 4 a sharp edged orifice J′ is substituted for the venturi J.

The diaphragm chamber M is shown located so that its center is higher than the passage N. In the Kittler patent referred to above, it has been found advantageous to locate the passage N above the chamber M, but the drawings in this case were made diagrammatic to illustrate the feature shown by the parts B, C, D, E, F, G, J, and P, and this device is not restricted to carburetors in which the mixture ratio remains substantially constant at altitudes.

What I claim is:

1. In a carburetor having a source of fuel supply under substantially constant pressure, a fuel supply chamber connected thereto, a pressure reducing valve therefor adapted to maintain a relatively low pressure of constant value in said chamber, a fuel outlet passage from said chamber adapted to discharge into said carburetor, a second fuel passage connecting the high pressure fuel supply directly to the carburetor, a second fuel valve in said second passage, and means responsive to the flow of gasoline from the high pressure fuel inlet to the pressure reducing valve for operating said second valve for the purpose described.

2. In an internal combustion engine, the combination with a throttle controlled air inlet, of two fuel nozzles having restricted orifices arranged to discharge into said inlet adjacent to said throttle, a mechanically operated fuel pump for supplying liquid fuel to said nozzles, means controlled by the throttle for varying the area of the discharge orifice of one of said nozzles, and means actuated by the rate of flow through said one nozzle orifice for controlling the area of the other orifice.

3. Fuel control means comprising a source of fuel under a substantially constant pressure, a fuel passage leading therefrom to an engine intake conduit, a Venturi-shaped restriction in said passage, a second passage leading to said conduit, a regulating valve in said second passage, a chamber having a flexible wall exposed on one side to the fuel pressure in the first passage, a passage for exposing the other side of the flexible wall to the pressure existing in the throat of said venturi, a connection from said flexible wall to said valve, and yieldable means for closing said valve in opposition to the suction created in the throat of said venturi.

4. In an internal combustion engine fuel system, means providing a passage for supplying air to the engine, means for supplying fuel to said engine in quantities bearing a substantially constant ratio to quantities of air flowing through said passage per unit of time and over a substantial range of variation in quantities of air per unit of time, auxiliary fuel supply means including a valve operative to supply additional quantities of fuel to said engine over a portion of said range and in substantially predetermined ratio to quantities of air flowing through said passage per unit of time over said range portion, and means responsive to variations in atmospheric conditions and operatively associated with said valve to control the fuel supplied by said auxilliary supply means for varying the ratio of fuel to air over said range portion.

5. In an internal combustion engine fuel system, means providing a passage supplying air to the engine, means for supplying fuel to said engine in quantities bearing a substantially constant ratio to quantities of air flowing through said passage per unit of time and over a substantial range of variation in quantities of air per unit of time, auxiliary fuel supply means operative to supply additional quantities of fuel to said engine over a portion of said range and in substantially predetermined ratio to quantities of fuel flowing through the first said fuel supply means per unit of time over said range portion, and means responsive to variations in atmospheric conditions for modifying the operation of said auxiliary fuel supply means to vary the quantity of fuel supplied thereby.

6. In a fuel supply system, means providing an engine air intake passage for the supply of air and fuel and including a Venturi-shaped portion, a fuel conduit for supplying fuel from a fuel source to said passage, said fuel conduit including a Venturi-shaped portion for the flow of fuel only therethrough, means providing a second conduit for supplying fuel from said source to said passage, a valve for controlling flow of fuel through said second conduit, means responsive to the pressure drop at the throat of the Venturi-shaped portion of said air passage for controlling the flow of fuel through the first said conduit in predetermined ratio to air flow through said passage, and means responsive to the pressure drop at the throat of the Venturi-shaped portion of the first said conduit for operating said valve for controlling the flow of fuel through the second said conduit.

7. In a device of the character described, the combination with a throttle controlled air inlet, of two fuel nozzles having restricted orifices arranged to discharge into said air inlet, a mechanically operated fuel pump supplying liquid fuel to said nozzles, means controlled by the throttle for varying the area of the discharge orifice of one of said nozzles, and means actuated by the rate of flow through said one nozzle for controlling the area of the other orifice.

8. Fuel control means for an internal combustion engine carburetor comprising, means providing a fuel conduit for redelivering fuel to an engine, a source of fuel supply having a substantially constant pressure, a fuel passage leading from said source to said delivery conduit, a second fuel passage also leading to said delivery conduit, a restriction in the first mentioned passage, a regulating valve in the second passage, and means responsive to the drop in pressure created by said restriction for opening said valve for the purpose described.

9. In a carburetor having a mixture chamber of Venturi form, a fuel nozzle discharging therein, a source of fuel supply connected thereto and under a substantially constant pressure substantially greater than atmospheric pressure, a second fuel nozzle discharging into the mixture chamber, a valve controlling the flow to said second nozzle and normally closed under a relatively low rate of fuel flow to the first said nozzle, and means responsive to a predetermined increase in the fuel flow rate to the first nozzle for opening said valve.

10. In a fuel supply system, means providing an air passage, a fuel nozzle discharging into said passage, a source of fuel supply connected thereto, and under a substantially constant pressure substantially greater than atmospheric pressure, a second fuel nozzle discharging into said passage, a valve controlling the flow to said second nozzle and normally closed under a relatively low rate of fuel flow to the first said nozzle, and means responsive to a predetermined increase in the fuel flow rate to the first nozzle for opening said valve.

11. In an internal combustion engine fuel supply system, means providing a passage for the flow of air to be mixed with fuel and supplied to the engine, means for supplying fuel into said passage in substantially constant ratio to the air flowing through said passage throughout a substantial range of variation of such air flow per unit of time, and means mechanically independent of the first said supply means for supplying additional fuel to said engine over a part of said range of air flow variation in quantities substantially proportionate to the quantities of fuel supplied by the first said fuel supply means through said part of said range of air flow variation.

12. In an internal combustion engine fuel supply system, means providing a passage for the flow of air for combustion in the engine, means for supplying fuel to the engine in predetermined unit quantity per unit quantity of air flowing through said passage to the engine throughout a substantial range of variation of such air flow per unit of time, and means mechanically independent of the first said supply means and controlled by the rate of supply of fuel supplied by the first said fuel supply means for supplying additional fuel to the engine over a part of said range of air flow variation in quantities having a predetermined relation to the air flow through said passage over said part of said range.

MILTON E. CHANDLER.